Oct. 20, 1964　　　A. W. HOUSE　　　3,153,507
REMOVABLE HANDLE FOR CONTAINERS

Filed Nov. 27, 1962　　　2 Sheets-Sheet 1

INVENTOR.
Arthur W. House
BY L. S. Michelman
Atts.

Oct. 20, 1964 A. W. HOUSE 3,153,507
REMOVABLE HANDLE FOR CONTAINERS
Filed Nov. 27, 1962 2 Sheets-Sheet 2
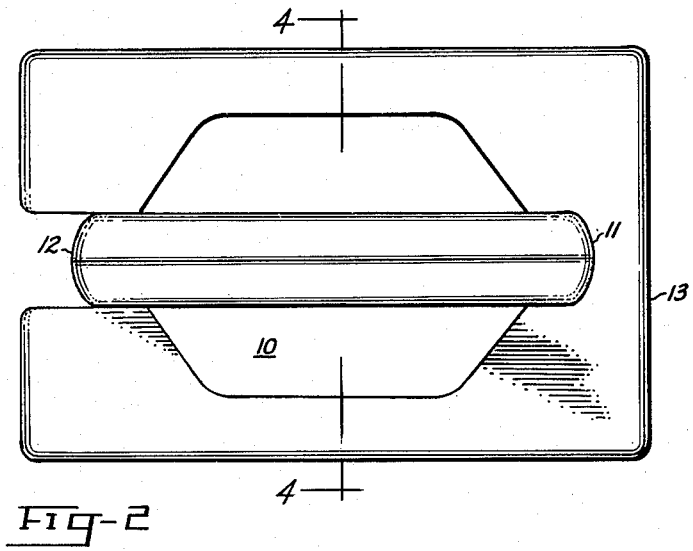
Fig-2
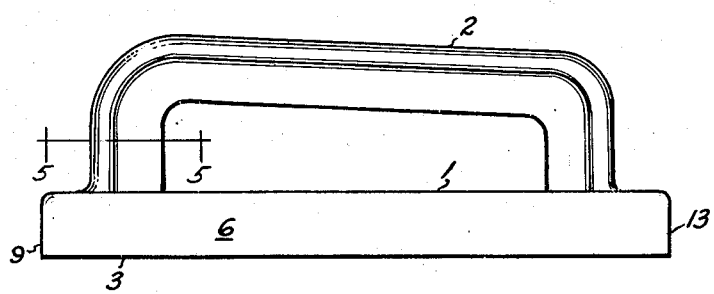
Fig-3
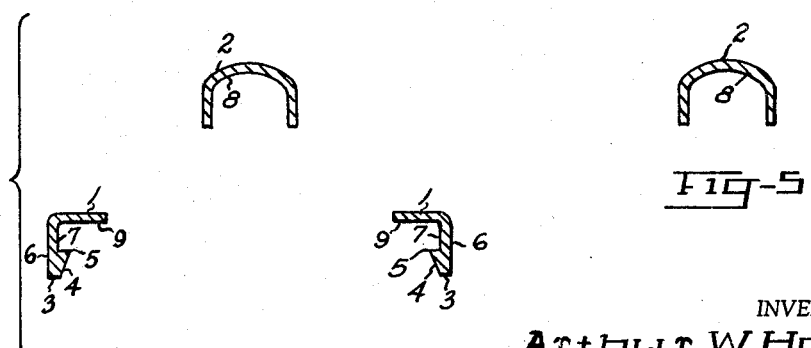
Fig-4
Fig-5
INVENTOR.
Arthur W. House

United States Patent Office 3,153,507
Patented Oct. 20, 1964

3,153,507
REMOVABLE HANDLE FOR CONTAINERS
Arthur W. House, 13 Cottage Road, Hazardville, Enfield, Conn.
Filed Nov. 27, 1962, Ser. No. 240,223
4 Claims. (Cl. 229—52)

This invention is concerned with a novel means for holding large containers by a removable handle. With the advent and use of the carton type container which is now to a great extent replacing glass bottles in the milk industry, as well as packaging in the soap and detergent industry, particularly to contain large economy amounts of soaps, it has become burdensome for the user of the carton to pour the contents therefrom conveniently because of the large size and weight of the container.

It is a primary object of the within invention to provide a handle assembly which will fit containers for which it is designed and which may easily be removed therefrom.

It is another object of the within invention to provide a removable type handle assembly that is designed for facilitating the efficient use and purpose of the containers.

It is still another object of the within invention to provide a means that will be secure for holding and handling of containers and will prevent accidental spilling of the contents from containers, while in use.

It is yet an additional object of the within invention to provide a removable type of handle for cartons that does not take up much room insofar as its own size is concerned and which may lend itself for storage in the kitchen drawer.

It is yet another object of the within invention to provide a handle that is inexpensive to manufacture, simple in construction, and easily attached by one having slight mechanical knowledge.

It is still an additional object of the within invention to provide a novel handle attachment for cartons and the like which will take up little space for its own packaging in its own sales distribution.

These and many other objects are obtained by the use of a flat handle portion that has gripping members upon its outside extremities, which gripping members adapt themselves to engage a container for which the handle has been designed in dimension. This gripping member eliminates various attachments that have been employed by other types of handle assemblies. The handle itself extends out from the basic member. The gripping members cut a track in the container for connecting the assembly to the container securely.

The invention may be more readily understood by reference to the following specification and to the drawing in which:

FIGURE 2 is a top plan view of the handle assembly.

FIGURE 3 is a side elevational view of the handle assembly.

FIGURE 4 is a view in cross-section taken along the lines 4—4 of FIGURE 2.

FIGURE 5 is a view in cross-section taken along the line of 5—5 of FIGURE 3.

Figure 1:
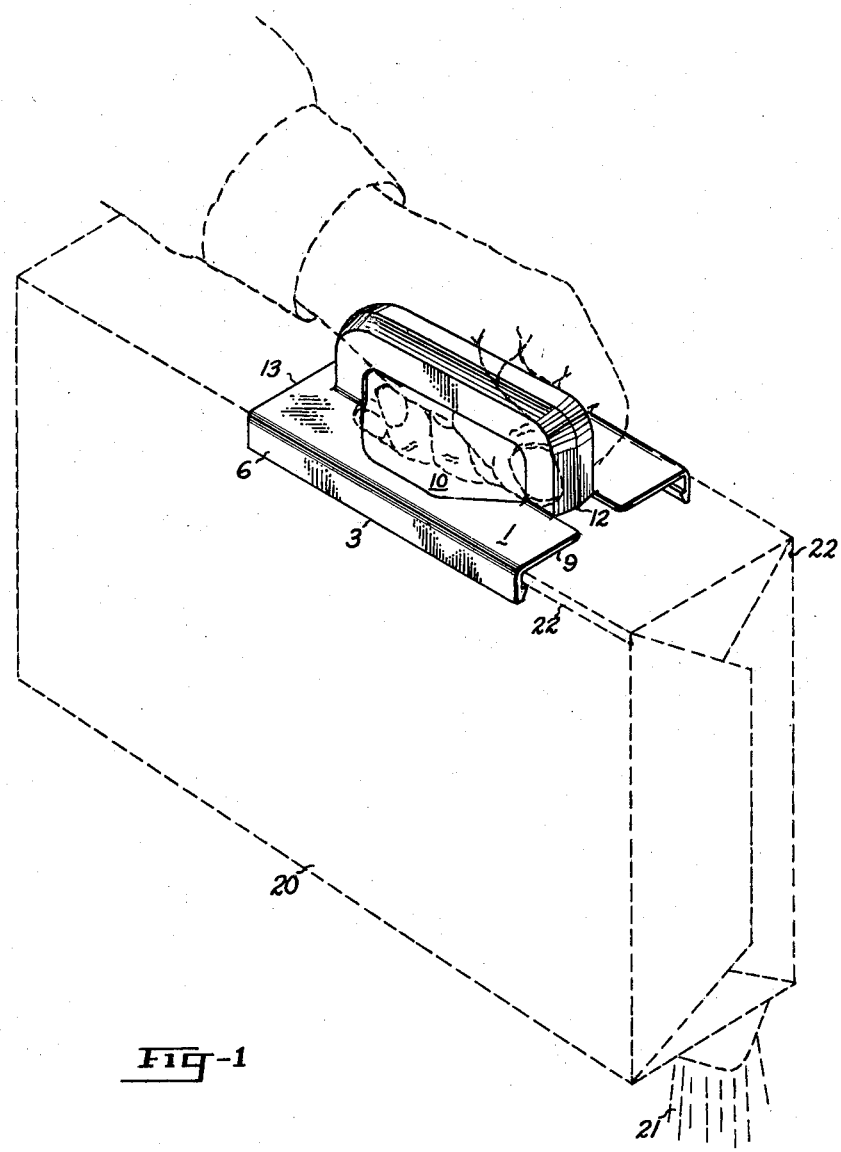
FIGURE 1 is a perspective view of the assembly in use upon a carton.

In FIGURE 1, a typical carton of the variety used for detergents or soaps is shown in dotted lines and indicated by 20. The ingredients 21 are also shown by dotted lines and appear as being poured from the container.

The entire handle assembly, with the user's hand appearing in dotted lines, is shown on one side of the box, in FIGURE 1.

The handle assembly consists of a flat main body portion 1. Rising away from the flat surface of the body portion 1 is the handle 2, itself. The handle 2 is connected to the main body portion 1 at the upper portion of the handle 12 and at the lower portion of the handle 11. This can be seen more clearly in the views of FIGURES 2 and 3. The handle is not solid, but is hollow and convex, as can be seen from the view of FIGURE 5. The handle has an inside concave surface 8 and an outside convex surface 2. The contour of FIGURE 5 runs throughout the length of the handle 2. Beneath the handle 2 is the open area 10.

The bottom edge 13 of the main body portion 1 runs straight across. However, in this particular embodiment, the top edge 9 of the main body portion 1 does not run straight across but bends around to meet the handle 2, leaving an opening as at 12, as can be seen in FIGURE 1. This particular feature of design is a manufacturing expedient for the purpose of molding the handle, rather than stamping the handle. This design is not crucial as to the function of the device. It could well be that the upper portion 9 of the main body 1 could be straight across as is 13.

The crucial novel means can be seen in the cross-section view of the gripping member in FIGURE 4. The outside surface 6 of the main body portion 1 has at its bottom an edge 3. The surface 4 extends diagonally towards the inside of the device and upwardly from the bottom edge 3. The gripping surface 4 has a sharp grooving edge 5. The grooving edge 5 is extremely sharp and extends straight towards and perpendicular to the inside surface 7, which surface 7 is substantially parallel to the outside surface 6 of the main body portion. The inside surface 9a of the main body portion 1 is contiguous with the surface 7.

Even when a container, such as a milk container or a container having soaps or detergents is filled, there is a certain amount of "play" or "give" permitted by the cardboard material. It is with this known fact that the within device has been conceived and invented. The user takes the handle assembly and places it at the very edge of the bottom of the smaller surface of the container. In this particular instance, reference may be had to the view of FIGURE 1. The user places the handle above the top and slides the handle down over the edges of the container forming grooves 22 (see the dotted lines in FIGURE 1) in the container 20. These grooves are formed because the edges 5 cut into the surface of the cardboard which, as already mentioned, "gives" somewhat. The result is a tight frictional fit that will not loosen. The handle is so designed in size and dimension that the fit is sufficient to hold the carton tightly but not tight enough to cut holes or slots in the surface of the carton. The pressure from the edges 5 pressing into both of the opposite sides of the carton, as in a squeeze, is such that the handle assembly will not slip on the carton but will hold the carton firmly. Once the handle assembly has been placed into position, as can be seen in FIGURE 1, it is only necessary to slide it back over the grooves already formed after the portion has been emptied, to remove same.

It is contemplated that the within handle assembly will be made of a polystyrene or similar type of plastic or synthetic material that has a certain amount of resiliency for permitting the handle to be bent as it is started on the edge of the container to form the grooves. Further, the gripping assembly shown in FIGURE 4 by the edge 5 and the gripping surface 4 and the bottom edge 3 is of such dimension and thickness that there is no resiliency at that point in the material. The edge 5 almost acts as a knife under these conditions. The only movement that can be had is between the surface 6 and the surface 9, since the surface 6 is bent outwardly away from the pressure of surfaces of the container which abut the edge 5 and the gripping surface 4.

It is contemplated that the dimensions of the invention herein may be varied to make it suitable with any type of container of the class described.

In consideration of the foregoing, I claim:

1. The combination of a container and a detachable handle for said container, said container being of substantially rectangular configuration and having opposing flat planar sides, said handle engaging the flat opposing sides and having a base, a hand gripping portion extending outwardly from the base, a pair of spaced substantially parallel side members extending downwardly from the base and spaced apart from one another by approximately the distance between the sides of the container, a container deforming and gripping portion projecting inwardly from the inside of each side member and located downwardly from the base to form a pocket on each side member above the deforming and gripping portion, said deforming and gripping portions terminating on the inside in a sharp edged surface, with the sharp edged surfaces of the two portions being spaced apart by a distance less than the distance between the sides of the container, said base, sides, and deforming and gripping portions being more rigid and unyielding than the sides of the container, said handle being slidably inserted over the flat walled container with the sharp edged surfaces of the deforming and gripping portions exerting a substantial pressure against the container sides and indenting the sides to deform portions of the sides into said pockets and tightly retain the handle onto the container.

2. In the combination of claim 1, said detachable handle including said base, hand gripping portion, sides, and container deforming and gripping portions, being integrally formed of plastic.

3. In the combination of claim 1, said detachable handle being integrally molded of plastic material.

4. In the combination of claim 1, said side members having a flat thick edge at the bottom of said side members and having an inside surface that tapers diagonally toward said handle, terminating in said sharp edged surfaces.

References Cited in the file of this patent
UNITED STATES PATENTS

| | | |
|---|---|---|
| 2,680,040 | Gribskov et al. | June 1, 1954 |
| 2,709,618 | Melville | May 31, 1955 |
| 2,709,619 | Melville | May 31, 1955 |
| 2,871,055 | Glazer | June 27, 1959 |